United States Patent
Gatinois et al.

(10) Patent No.: US 9,539,881 B2
(45) Date of Patent: Jan. 10, 2017

(54) INSULATED HEATING MODULE FOR A SUPPLEMENTAL HEATING DEVICE

(71) Applicant: Valeo Systemes Thermiques, Le Mesnil Saint Denis (FR)

(72) Inventors: Jean Gatinois, Jouars Pontchartrain (FR); Pierre Derveloy, Montigny le bretonneux (FR); Laurent Tellier, Paris (FR)

(73) Assignee: VALEO SYSTEMES THERMIQUES, Le Mesnil Saint Denis (FR)

( * ) Notice: Subject to any disclaimer, the term of this patent is extended or adjusted under 35 U.S.C. 154(b) by 297 days.

(21) Appl. No.: 14/349,198

(22) PCT Filed: Oct. 11, 2012

(86) PCT No.: PCT/EP2012/070139
§ 371 (c)(1),
(2) Date: Apr. 2, 2014

(87) PCT Pub. No.: WO2013/053807
PCT Pub. Date: Apr. 18, 2013

(65) Prior Publication Data
US 2014/0231411 A1   Aug. 21, 2014

(30) Foreign Application Priority Data
Oct. 14, 2011   (FR) ...................... 11 03148

(51) Int. Cl.
*H05B 3/06* (2006.01)
*B60H 1/22* (2006.01)
(Continued)

(52) U.S. Cl.
CPC ............ *B60H 1/2225* (2013.01); *F24H 1/009* (2013.01); *F24H 3/0405* (2013.01);
(Continued)

(58) Field of Classification Search
CPC ......... B60H 1/2225; H05B 3/00; H05B 3/262; H05B 3/50; H05B 3/141; H05B 3/12; H05B 2203/023; H05B 2203/02; F24H 1/009; F24H 3/0405; F24H 3/0429; F24H 3/0435; F24H 3/0441; F24H 9/1872; Y10T 29/49085
See application file for complete search history.

(56) References Cited

U.S. PATENT DOCUMENTS 5,077,889 A * 1/1992 Matsuda .................. H05B 3/50
228/180.1
5,326,418 A * 7/1994 Yeh ........................ H05B 3/141
156/291
8,059,944 B2  11/2011 Pierron et al.

FOREIGN PATENT DOCUMENTS

EP     0 368 206 A2    5/1990
EP     1 839 920 A1   10/2007
(Continued)

OTHER PUBLICATIONS

International Search Report for Application No. PCT/EP2012/070139 dated Dec. 20, 2012, 7 pages.

*Primary Examiner* — Shawntina Fuqua
(74) *Attorney, Agent, or Firm* — Howard & Howard Attorneys PLLC

(57) ABSTRACT

The invention relates to a heating module for a supplemental electric heating device for heating an airflow, comprising at least one heat-conductive bar against which at least one electric resistor is arranged. The heat-conductive bar is partially electrically insulated by an insulating coating in order to prevent potential short-circuits and to ensure proper operation and optimal safety when heating the passenger compartment of a vehicle.

13 Claims, 4 Drawing Sheets

(51) Int. Cl.
*F24H 1/00* (2006.01)
*F24H 3/04* (2006.01)
*F24H 9/18* (2006.01)
*H05B 3/26* (2006.01)
*H05B 3/00* (2006.01)

(52) U.S. Cl.
CPC ......... *F24H 3/0429* (2013.01); *F24H 3/0435* (2013.01); *F24H 9/1872* (2013.01); *H05B 3/00* (2013.01); *H05B 3/262* (2013.01); *H05B 2203/023* (2013.01)

(56) References Cited

FOREIGN PATENT DOCUMENTS

| | | | |
|---|---|---|---|
| EP | 1839920 | * | 10/2007 |
| EP | 2 292 455 A1 | | 3/2011 |
| FR | 2 855 933 A1 | | 12/2004 |
| WO | WO 2006/073264 A1 | | 7/2006 |

* cited by examiner

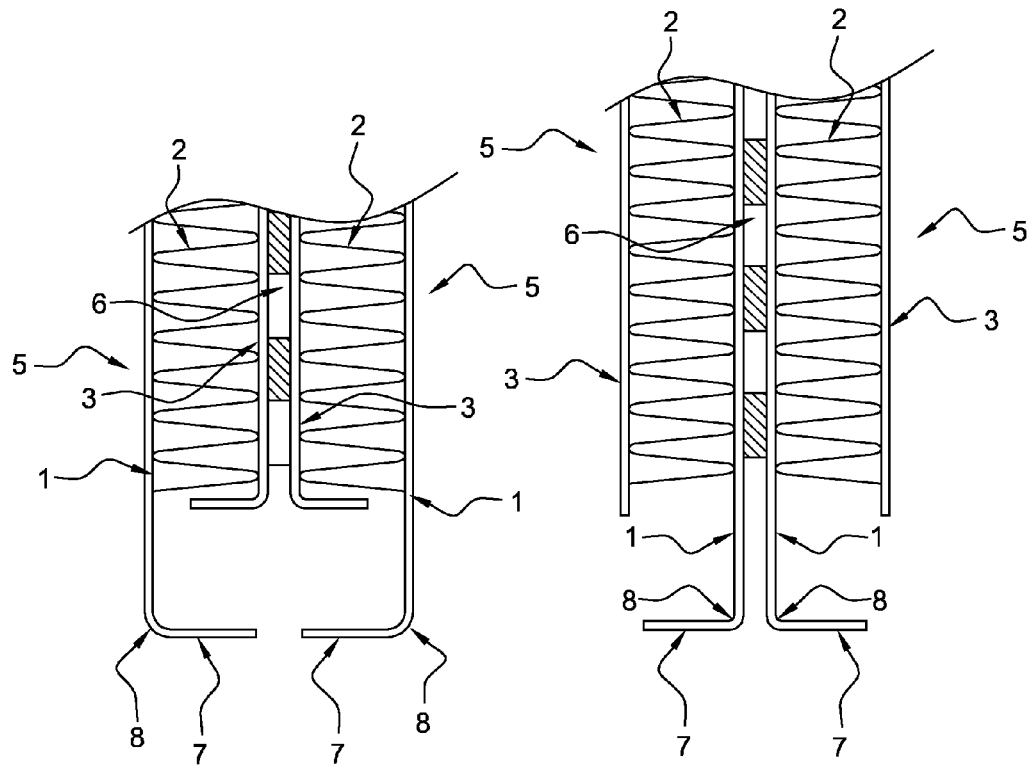
Fig. 5
Fig. 6
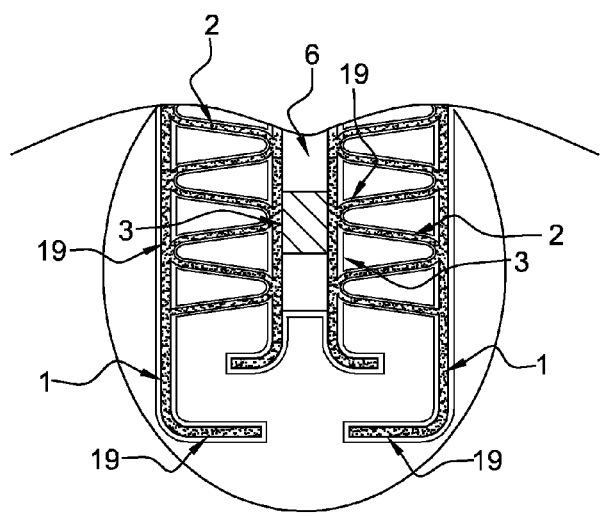
Fig. 8
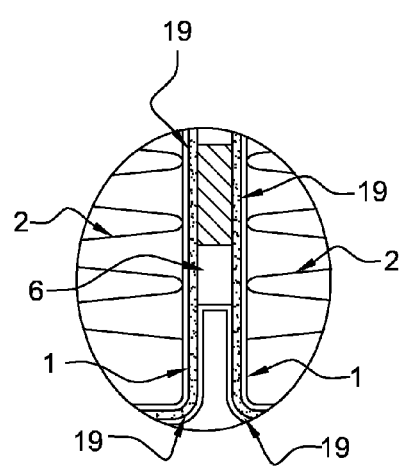
Fig. 9

INSULATED HEATING MODULE FOR A SUPPLEMENTAL HEATING DEVICE

RELATED APPLICATIONS

This application is the National Stage of International Patent Application No. PCT/EP2012/070139, filed on Oct. 11, 2012, which claims priority to and all the advantages of French Patent Application No. FR 11/03148, filed on Oct. 14, 2011, the content of which is incorporated herein by reference.

The present invention relates to the field of supplemental heating radiators, notably for heating, ventilation and/or air-conditioning installations for the passenger compartment of motor vehicles (HVAC).

When the outside temperatures are low, and particularly in winter, a certain time elapses between the time when the car starts and the time when warm air can emerge from the aeration/deicing nozzles. This is caused by the time taken for the fluid of the cooling circuit of the heat engine of the car to rise in temperature, this fluid being used to heat the air in the passenger compartment by means of a heating radiator. In order to overcome this disadvantage, it has been proposed to install, in addition to the thermal heating radiator, a supplemental electric heating device, powered by an electrical source of the vehicle, making it possible to heat the air passing through that supplemental electric heating device much more quickly.

Supplemental electric heating devices are known which are constituted by an assembly of several heating modules, composed of at least one heat-dissipating bar that is insulated by a special assembly of components between the resistors, the electrodes and the heat dissipaters, each module being surrounded by a mounting frame, such as described by the patent application WO2006073264.

However, these devices have the disadvantage of necessitating an assembly of a large number of components, which involves very precise adjustment constraints, a rigorous order of assembly and, consequently, a high final cost.

Another known disadvantage of these assemblies relates to the external insulation of the supplemental heating devices. In fact, there is a weak point between the positive and negative phases of a same heating module constituted by two heat-dissipating bars, or between two bars of the different phases. This signifies that if a metal or electrically conductive part should touch the heating device, then that metal part could create a short-circuit which would harm the correct functioning of the electrical circuit of the vehicle.

Moreover, the assemblies of supplemental heating devices in most cases are an assembly of several heating modules with five phases: three positive and two negative. This assembly has limits, because the loads are different between the phases, which creates an unequal thermal behavior and obliges the manufacturers of heating modules to check the voltages of each module very accurately with respect to the others, which makes the production process more difficult.

As for any electrical device, the constituent components must be partly insulated in order to prevent possible short-circuits and also to ensure correct operation and optimal safety.

The purpose of the present invention is to overcome the disadvantages of the prior art described above.

For this purpose, the invention proposes a heating module of a supplemental heating device intended to heat an airflow, comprising at least one heat-conductive bar against which at least one electrical resistor is disposed. The heat-conductive bar is partially electrically insulated. Such a module, because of its at least partial insulation, ensures a rapid heating of the passenger compartment in a secure and reliable manner in terms of safety, because the risk of short-circuit is eliminated.

According to an embodiment of the invention, the heating module is composed of two heat-conductive bars separated by a resistor, preferably constituted by at least one resistive element having a positive temperature coefficient (PTC). Such PTC resistive elements used as heat-generating elements are distinguished by the fact that the electrical resistance increases as the temperature of the element increases. A self-regulation phenomenon is thus created.

Advantageously, each heat-conductive bar is constituted by an insert sandwiched between an electrode and a plate.

In particular, the resistive elements can be fixed to the heat-conductive bars by adhesion.

In such a case, the adhesion will be provided by an adhesive that is advantageously of the electrical energy conducting type.

According to a first embodiment, the plates are disposed on either side of the resistive element and in contact with it.

In a second embodiment, the electrodes of the two respective bars are in direct contact with the resistive element.

The electrode is preferably constituted by at least one connector set which is used for transmitting the electrical energy to the heating module.

Preferably, and for conductivity and weight reasons, the components of the heat-conductive bar, such as at least the electrode, the inserts, the plate and/or the connector set, are made of aluminum.

The heating module, after assembly, can then be electrically insulated from any external element by the application, preferably by spraying, of an insulating coating, ideally made of polyester. For optimum insulation, the deposit of insulating coating must have a thickness of between 20 and 120 μm.

The supplemental heating device is composed of a definite number of heating modules. As each module is powered separately, the frame serves only to hold these modules in position for the correct operation of the supplemental heating.

In overall terms, the device according to the present invention for the supplemental heating of the passenger compartment of motor vehicles makes it possible to provide fast, reliable and safe heating.

The particular assembly of the heating module as described above makes it possible to not have thermal unbalance phenomena between the different phases. Each heating module is equipped with a resistive line. Thus, by adding heating modules one after the other and because they are intrinsically insulated, the same current level will be obtained in the lines.

Moreover, the short-circuit problem is eliminated because, as the heating modules are insulated, nothing can disturb the correct operation of the supplemental heating device.

Other advantages and features of the invention will emerge from the description of embodiments given hereafter with reference to the appended drawings in which:

FIG. 5 is a front view of a first embodiment of the present invention;

FIG. 6 is a front view of a second embodiment of the present invention; and

FIG. 8 is a detail view of FIG. 5; and

FIG. 9 is a detail view of a part of FIG. 6.

Figure 1:
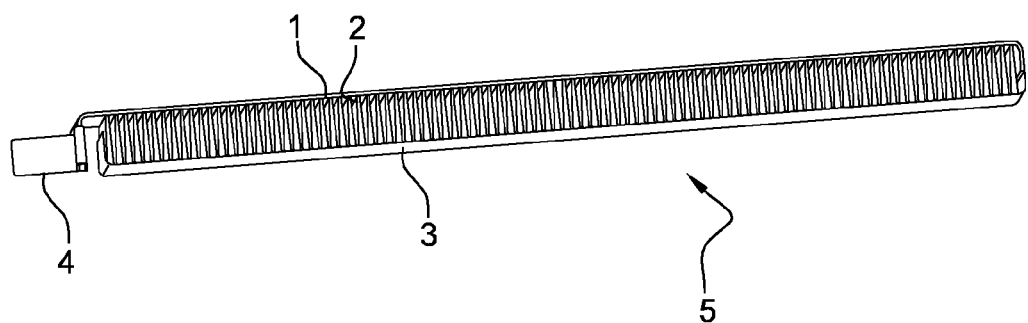
FIG. 1 is a perspective view of a heat-conductive bar according to a first embodiment of the present invention.

With reference to FIG. 1, the figure shows a heat-conductive bar 5 in detail. The heat-conductive bar 5 comprises an insert 2, an electrode 1 and a plate 3. The insert 2 is in contact with the electrode 1 and the plate 3. The insert 2 is in the form of a corrugated metal sheet, advantageously made of aluminum or of aluminum alloy. The corrugation of the metal sheet is obtained by folding or by passing the sheet between shaping wheels. The corrugated metal sheet thus has a zigzag shape. This particular shape thus creates peaks 9 that are the curved parts of the corrugated metal sheet and are alternately in direct contact with the electrode 1 and with the plate 3.

The plate 3 provides the electrical contact between the electrode 1 and a resistive element 6 via the insert 2 and the thermal contact between the insert 2 and the resistive element 6. The plate 3 is preferably made of aluminum or of aluminum alloy. It is of generally flat shape apart from at its ends. The flat part is in electrical and thermal contact with the peaks 9 of the insert 2.

The resistive element 6 is advantageously a resistor with a positive temperature coefficient (PTC). The resistive element 6 gives off heat when an electrical current passes through it. The element having a positive temperature coefficient has the feature of being self-regulating, that is to say that the electrical resistance increases as the temperature of the element increases, which prevents any risk of overheating.

The insert 2 makes it possible to dissipate the heat produced by the resistive element 6 by heat exchange with an airflow passing across the heat-conductive bar 5.

The electrode 1 is a metal strip 12 in contact with the insert 2 and has, at one end, a termination 4 which provides the electrical connection between the resistive element 6 and the electrical energy generated by the vehicle. The electrode 1 is preferably made of aluminum or of aluminum alloy. Similarly, the termination 4 is preferably made of aluminum or of aluminum alloy.

Figure 2:
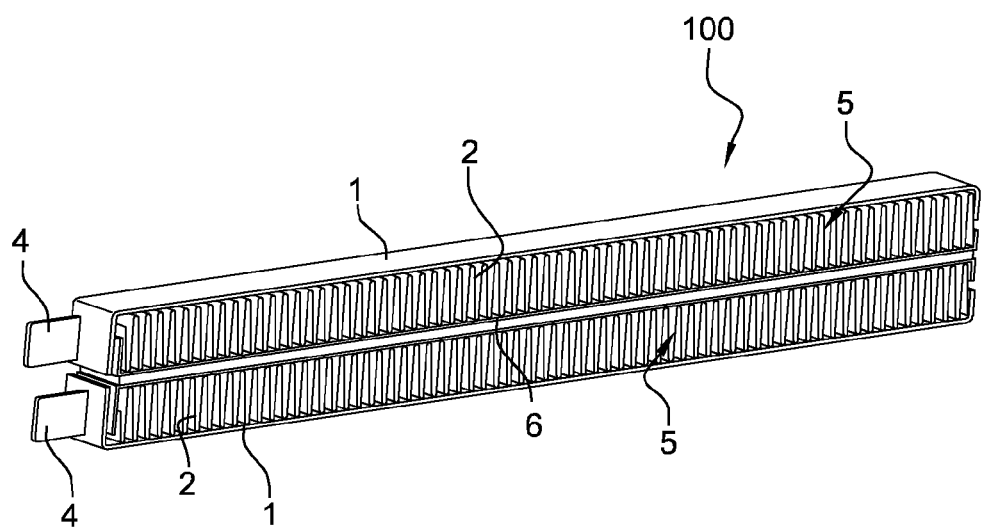
FIG. 2 is a perspective view of a heating module according to the present invention.

FIG. 2 shows a heating module 100 according to the invention. Such a heating module 100 is located inside an electrical heating device 10, shown in FIG. 7, comprising a plurality of heating modules 100. Such an electrical heating module 10 is installed within a heating, ventilation and/or air-conditioning system of a motor vehicle in order to produce a warm airflow suitable for being distributed in the passenger compartment, in particular starting from the first moments of operation of the vehicle.

The heating module 100 comprises at least one resistive element 6 and two heat-conductive bars 5. The resistive element 6 is bonded to the heat conductive bars 5.

The two heat-conductive bars 5 are disposed on either side of the resistive element 6. In this way the two heat-conductive bars 5 are each disposed on a large face of the resistive elements 6. The expression "large face" refers to the face of the PTC resistive elements having the biggest dimensions.

Figure 3:
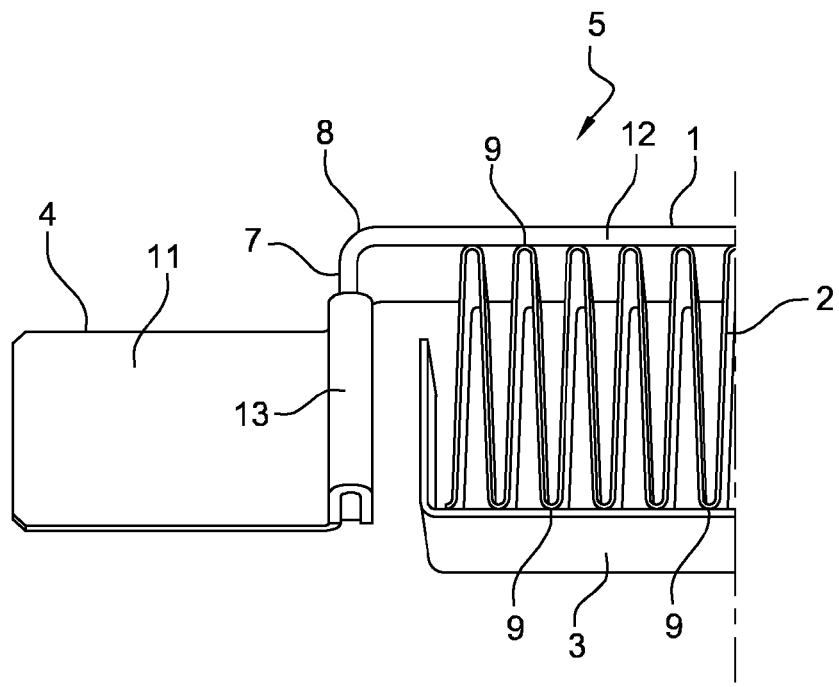
FIG. 3 is a detailed perspective view of a first end of the heat-conductive bar shown in FIG. 1.

FIG. 3 shows one of the ends of the heat-conductive bar 5 and, in particular, the end providing the electrical connection of the heating module 100 to the electrical system of the vehicle. According to FIG. 3, the insert 2 is sandwiched between the electrode 1 and the plate 3. The electrode 1 comprises a flat part and a curved part. The flat part of the electrode 1 is in electrical contact with the peaks 9 of the insert 2.

The electrode 1, in the form of a metal strip 12, has a tongue 7 at one end. The tongue 7, connected to the metal strip 12 by a bend 8, is itself sandwiched by the termination 4. Preferably, the tongue 7 is disposed perpendicular to the metal strip 12 since the bend 8 forms an angle of 90° thus advantageously forming an "L" shape.

The termination 4, preferably made of aluminum, comprises a flat connector 11 for connection to the electrical system of the vehicle and an arm 13 providing the contact. In a preferred embodiment, the arm 13 has a "U" shape clamping the tongue 7 of the electrode 1. The mechanical connection between the tongue 7 and the arm 13 is the part of the heat-conductive bar 5 which is received inside a positioning means that is not shown.

Figure 4A:
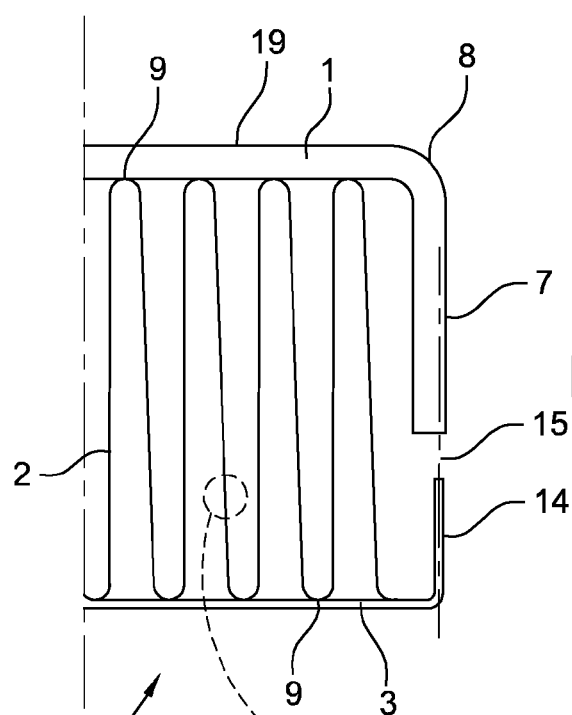
FIG. 4a is a detailed perspective view of a second end of the heat-conductive bar shown in FIG. 1.

FIG. 4a shows the other end of the heat-conductive bar 5 which is opposite to the end shown in FIG. 3. According to FIG. 4a, the insert 2 is sandwiched between the electrode 1 and the plate 3. The peaks 9 of the corrugated metal sheet forming the insert 2 are alternately in direct contact with the electrode 1 and the plate 3. The electrode 1 has a second tongue 7 connected to the metal strip 12 by a bend 8. Moreover, the plate 3 is terminated by a bent terminal 14. The terminal 14 is advantageously disposed perpendicular to the plate 3 in such a way as to extend in a direction parallel with the direction of the tongue 7. A gap 15 separates the tongue 7 from the terminal 14 in order to prevent electrical continuity between the electrode 1 and the plate 3.

Figure 4B:
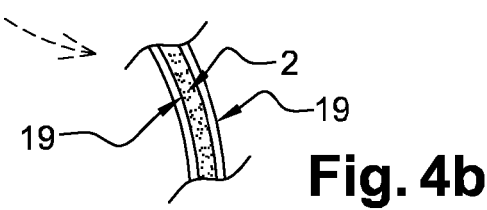
FIG. 4b is a detail view of FIG. 4a of an insert of the heat-conductive bar shown in FIG. 1.

FIG. 4b shows a detail view of the structure of the insert 2, covered on both sides of the metal sheet by an insulating coating layer 19, preferably made of silicone or of polyester.

FIG. 5 shows the heating module in a first embodiment. The resistive element 6 is bonded to the heat-conductive bar 5 on the side where the plate 3 is situated. The plate 3 is situated inside the heating module 100 and the electrode 1 is situated on the outside of the heating module 100. The resistive element 6 can advantageously be fitted with an insulating element 19. Preferably, the electrode 1 and the plate 3 have curves at their ends. The resistive element 6, the plates 3 and the inserts 2 are sandwiched between the electrodes 1.

FIG. 6 shows the heating module in a second embodiment. The resistive element 6 is bonded to the heat-conductive bar 5 on the side where the electrode 1 is situated. The electrode 1 is situated inside the module 100 and the plate 3 is situated on the outside of the module 100. The resistive element 6 can advantageously be fitted with an insulating element. Preferably, the electrode 1 and the plate 3 have curves at their ends. The resistive element 6, the electrodes 1 and the inserts 2 are sandwiched between the plates 3.

Figure 7:
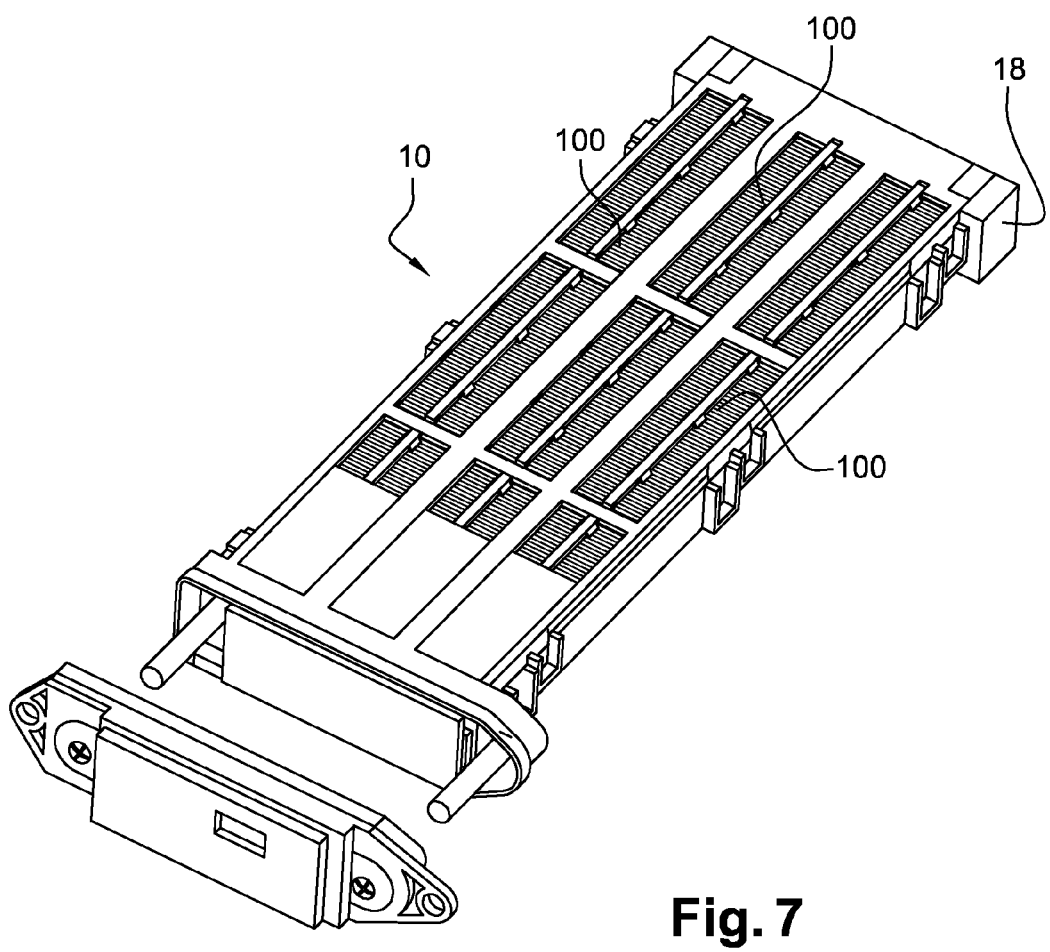
FIG. 7 is a perspective view of a supplemental heating device according to the present invention.

As shown in FIG. 7, the supplemental heating device 10 comprises a frame 18, for example made of plastic, in which is housed a plurality of heating modules 100. The heating modules 100 are disposed parallel with each other and extend over the whole length of the frame 18 in such a way as to be exposed directly to the air passing through the frame 18. In the non-limiting example shown in FIG. 7, the supplemental heating device 10 comprises three heating modules 100.

FIG. 8 shows a detail view of FIG. 5 illustrating the heating module in the first embodiment. According to the first embodiment, the plate 3 and the resistive element 6 are respectively covered by an insulating coating 19, preferably made of silicone or of polyester. Advantageously, the thickness of the insulating coating layer 19 is between 20 and 120 μm. According to the first embodiment, the bonding between the plate 3 and the resistive element 6 is carried out before depositing the insulating coating 19.

FIG. 9 shows a detail view of FIG. 6 illustrating the heating module in the second embodiment. According to the second embodiment, the electrode 1, the insert 2, the plate 3 and the resistive element 6 are respectively covered with the insulating coating 19, preferably made of silicone or of polyester. Advantageously, the thickness of the insulating coating layer 19 is between 20 and 120 μm. According to the second embodiment, the bonding between the plate 3 and the resistive element 6 is carried out before depositing the insulating coating 19.

Moreover, according both of the embodiments, the assembly between the electrode 1 and the connector 11 is also carried out before depositing the insulating layer 19. The connector 11 is not however covered by the insulating coating 19.

The invention claimed is:

1. A heating module (100) of a supplemental heating device (10) for heating an airflow, the heating module (100) comprising at least one heat-conductive bar (5) against which at least one electrical resistor (6) is disposed, the at least one heat-conductive bar comprising at least one insert (2), an electrode (1), and a plate (3) having the at least one insert (2) disposed between the electrode (1) and the plate (3), wherein the heat-conductive bar (5) is partially electrically insulated, and the electrical resistor (6) is disposed against the plate (3).

2. The heating module (100) as claimed in claim 1, wherein the electrical resistor (6) comprises at least one resistor having a positive temperature coefficient (PTC).

3. The heating module (100) as claimed in claim 1, wherein the electrode (1) is in direct contact with the connector (11).

4. The heating module (100) as claimed in claim 1, wherein the inserts (2), the connector (11) and the electrode (1) comprise aluminum.

5. The heating module (100) as claimed in claim 1, wherein the electrode (1) and the inserts (2) and/or the resistor (6) are disposed on the heat-conductive bar (5) by a conductive adhesive material.

6. The heating module (100) as claimed in claim 1, wherein the electrode (1) and the resistor (6) are electrically insulated by an insulating coating (19).

7. The heating module (100) as claimed in claim 6, wherein the inserts (2) and/or the plate (3) are electrically insulated by an insulating coating (19).

8. The heating module (100) as claimed in claim 6, wherein the insulating coating (19) comprising polyester.

9. The heating module (100) as claimed in claim 8, wherein the insulating coating (19) has a thickness of between 20 and 120 μm.

10. A supplemental heating device (10) comprising at least one heating module (100) as claimed in claim 1.

11. The heating module (100) as claimed in claim 2, wherein the heat-conductive bars (5) comprise at least one insert (2) disposed between, on the one hand, a connector (11) and/or an electrode (1) and, on the other hand, a plate (3).

12. The heating module (100) as claimed in claim 1, wherein the electrode (1) is in direct contact with the connector (11).

13. The heating module (100) as claimed in claim 5, wherein the conductive adhesive material is a conductive glue.

* * * * *